June 18, 1946.  A. HANSEN  2,402,282
BUSINESS RECORD
Filed Dec. 14, 1942  2 Sheets-Sheet 1

INVENTOR,
ALDEN HANSEN.
BY Charles O. Bruce
ATTORNEYS.

Fig. 1.

June 18, 1946.  A. HANSEN  2,402,282
BUSINESS RECORD
Filed Dec. 14, 1942  2 Sheets-Sheet 2

INVENTOR,
ALDEN HANSEN.
BY Charles O. Bruce
ATTORNEYS.

Patented June 18, 1946

2,402,282

UNITED STATES PATENT OFFICE 2,402,282

BUSINESS RECORD

Alden Hansen, San Francisco, Calif.

Application December 14, 1942, Serial No. 468,992

10 Claims. (Cl. 283—66)

My invention relates to the preparation and keeping of business records and more particularly to forms for such purpose.

Modern businesses have become so large and intricate that the keeping of current records has become a major problem. We have as an example of this the chain groceries, where the distribution of items to each of the departments of each of the hundreds of stores in a chain must be recorded from day to day and correlated in the process of determining profits and inventories, as well as keeping comparative records of the various stores, etc. The preparation and calculation of such records require not only a number of comptometer operations, but considerable copy work, and consequently, considerable probability of error in incorporating figures from one form to another exists. To appreciate, in a small degree, the amount of such work involved, it might be well to briefly outline a typical example of present day practice along these lines as it pertains to chain grocery stores.

A chain grocery may comprise hundreds of individual stores and each individual store, for the purpose of maintaining records, may be divided up into a number of departments such as, for example, milk and cream, bread and cake, produce, butter department, groceries, ice cream, poultry, etc. Merchandise consigned on a particular day to the "produce" department, for example, of a particular store, is listed on an invoice which is receipted by the store manager or clerk upon receipt of the produce in question. Such invoice is returned to the central office where the items on each of the receipted invoices from the many stores are totaled and both the retail value and cost price to the store are indicated thereon. These are then stacked and thumbed through by a clerk who copies the retail values and cost prices from each of the "produce" invoices of each store to a common sheet to provide a "Listing or Department Billing" for that day, as to the "produce" department only.

A similar routine is followed in connection with each department of which there may be a substantial number, as previously indicated.

The same invoice figures are also copied to provide a "daily report of business" for each store, in which is listed the deliveries for a particular day to each department of such particular store. The totals from each of such "daily reports of business" for a particular day are then copied to produce a "daily recap of reports of business."

The above procedure is repeated from day to day with each day providing substantially the same amount of copy work and comptometer operations. The routine procedure could be carried further to include the preparation of weekly and monthly reports, inventories and the like, all involving their share of copy work, and adding immeasurably to the probability of error, which if such error occurs, requires considerable checking and rechecking to establish correct balances and totals.

Among the objects of my invention are:

1. To provide novel and improved means for preparing business records.

2. To provide a novel and improved means for preparing business records involving less comptometer operations than formerly and no copy work at all, thus considerably reducing the probability of error.

3. To provide novel and improved means for preparing business records which enables quicker results with less probability of error.

4. To provide a novel and improved means for preparing business records at a saving of the order of thirty-five per cent in the expense normally connected therewith.

Additional objects of my invention will be brought out in the following description of the same taken in conjunction with the accompanying drawings wherein:

Fig. 1 is illustrative of a foundation form designed for use in connection with my invention.

Fig. 2 is an auxiliary form designed for cooperation with the foundation form of Fig. 1 in accordance with the teachings of my invention.

Fig. 3 is a view illustrating the manner in which the two forms cooperate in carrying out the practice of my invention.

The forms illustrated in Figs. 1 to 3 of the drawings are merely examples illustrating one specific application of my invention, and while my invention is to be described in connection with such specific embodiment thereof, it is to be understood that such forms may vary considerably without departing from the fundamental principle underlying my invention.

In its preferred embodiment, I provide a foundation form 5 having a plurality of columns 7 preferably determined by spaced vertical lines 9. At the upper end of each column, I form, by means of transverse horizontal lines 11, a pair of vertically disposed spaces 13 and 15, in the upper one of which I provide an indicia 17 identifying that particular column in which the indicia has been placed. The nature of the indicia will depend upon the use to which the form is to be put.

In addition to the matter thus far appearing on the foundation form under consideration, I prefer to rule the columns 7 with a number of equally spaced transverse lines 19 across the form. Such rulings on my form, however, do not perform the customary function of guiding the disposition of writing, as no writing is necessarily applied directly to the columns of this foundation form. The rulings perform an entirely different guiding function namely, in connection with the use of the form 21 of Fig. 2 of the drawings, as will be brought out subsequently.

The form of Fig. 2 which may be termed an auxiliary form, comprises a sheet 23 having a plurality of spaced vertical lines 25 traversed by rulings 27 corresponding to the rulings 19 of the foundation form of Fig. 1. The form is provided with score lines 29 between the spaced vertical lines 25 and when so scored, the form becomes a plurality of ruled, detachable strips 31 having one of the spaced vertical lines running lengthwise thereof. Where monetary values are to be entered between the rulings 27 of such a strip, this center line may be utilized to differentiate between the dollars and the cents columns and will be designated as dollars-cents line.

At the upper end of each strip in a space 33 provided therefor, there is disposed an indicia 35 corresponding to that appearing at the top of one of the columns of the foundation form. With respect to the foundation form, the strips 31 are slightly shorter in length than the columns so that when a strip is laid upon a column having a corresponding indicia, the indicia at the head of the strip will fall within the space 15 just below the indicia at the head of that column.

The spacing between the scored lines 29 of the auxiliary form 21 is preferably somewhat less than the spacing between the spaced vertical lines 9 of the foundation form, so that the strips may conveniently be placed within a particular column with little danger of overlapping any portion of an adjacent column.

These strips are intended for attachment to the foundation form, and while this attachment may be accomplished by clipping or stapling the strips to the foundation form, it is preferred that the auxiliary form be of paper having a gummed backing whereby the strips formed therefrom may be adhesively secured individually to the foundation form. When attaching a strip to the column of the foundation form, the rulings 19 on the foundation form 5 function as a guide, not only in facilitating the disposition of such strip normal to the lower or bottom edge of the form, but also in matching up the rulings on adjacently attached strips whereby any matter written into the spaces of adjacently disposed strips will be properly lined up horizontally across the foundation form.

To explain the manner in which these forms may be utilized to realize the objects of my invention, it will be assumed that the forms have been laid out for use in connection with the keeping of daily records of a chain grocery. For this purpose, the columns of the foundation form may carry at the heads thereof, indicia designating the various departments of an individual store in a chain. For a large chain, where there are more stores than spaces on a strip, the auxiliary form may comprise a number of strips provided at the head of each with similar indicia designating the same department of a store, and for purposes of illustration we will assume it to be the "produce" department. The individual store numbers will be indicated between the rulings on the strips without, however, interfering with the space provided for the dollars and cents valuations.

In utilizing these blanks, the items on each receipted invoice are no longer totaled on the particular invoice, as in prior practice, to give the retail values and cost prices of the goods itemized thereon, and then later copied to other forms, but such values are entered directly into the appropriate space in a strip bearing that store number to which the invoice pertains. In the illustration under consideration, the retail value may be entered in the appropriate place on one strip and similarly, the cost price of the same delivery may be entered in the appropriate space of a corresponding strip. To avoid any possible confusion between the strips bearing the retail values and those bearing the cost prices, I prefer to make the strips relating to the retail values of different color from the others and the same means of differentiation may be applied to the foundation forms to which the strips are to be applied.

Upon completion of the information on these strips, they are detached and secured in the proper column of an appropriately prepared foundation form. The proper location of these strips on the foundation form is facilitated by the indicia at the head of each strip and at the head of each column, and the proper placement of such strips can always be checked by the fact that the application of a strip leaves the indicia at the head of the column exposed at all times.

Where the cost to the store is a fixed percentage of the retail value, the preparation of daily cost records may be avoided, since the cost over a stated period of time only is of interest and this can be readily calculated from the retail value records for such periods. The differently colored forms can then be utilized to carry such values.

When the foundation form has been completely filled with appropriate strips, useful information as to the daily delivery to any one department of the entire chain may be readily obtainable by adding the columns vertically, and further useful information relative to the total daily delivery to each individual store may be readily obtainable by adding the items horizontally.

It may also be of interest to the main office to be in a position to determine the total delivery over a period of time to any one of the departments of a store in the system. This may be obtained very conveniently through the application of carbon copies of the original daily strips, to a separate foundation form devoted exclusively to the daily delivery to that particular department for the stores of the whole system. Thus, if carbons of the daily produce strips are applied from day to day to a foundation form carrying the caption "Produce," the total of each horizontal line of figures gives the total produce deliveries to the stores as indicated, and over a period of time represented by the number of strips.

Whether or not one makes use of carbon copies in the application of my invention to the keeping of records, the important fact remains that the preparation and keeping of such records involves no copy work on the part of personnel, thereby eliminating a prevalent source of error in previous methods.

The time element involved in preparing records is reduced considerably by the fact that a number of employees may work together in the filling out of one foundation form since the strips are prepared separately and later assembled to the foundation form.

At the same time, I have found that my system considerably reduces the number of comptometer operations, and all in all results in a saving in expense over previous methods of the order of approximately thirty-five per cent.

My invention is therefore productive of novel and improved results in the preparation and keeping of records, and although the description thereof has been devoted to a preferred embodiment of the same as applied to one illustrative use, the combination of a foundation form and appropriate strips is applicable to a variety of situations. I, therefore, do not desire to be limited in my protection to the specific details of the embodiment described except as may be necessitated by the appended claims.

I claim:

1. The combination of a foundation form having a plurality of columns determined by spaced vertical lines and suitable indicia disposed at an end of certain of said columns identifying the same; and a plurality of ruled strips each of the approximate width of a column and individually attachable to said foundation form in a column thereof and having an indicia thereon corresponding to that at the end of one of said columns, said strips being somewhat shorter than said columns whereby upon application of said strips to said foundation form, the indicia on said columns may be exposed to indicate proper or improper location of strips on said foundation form.

2. The combination of a foundation form having a plurality of ruled columns determined by spaced vertical lines and suitable indicia disposed at an end of certain of said columns identifying the same; and a plurality of strips ruled to correspond to the rulings of said columns each strip being of the approximate width of a column and attachable to said foundation form in a column thereof and having an indicia thereon corresponding to that at the end of one of said columns, said strips being somewhat shorter than said columns whereby upon application of said strips to said foundation form, the indicia on said columns may be exposed to indicate proper or improper location of strips on said foundation form.

3. The combination of a foundation form having a plurality of ruled columns determined by spaced vertical lines and suitable indicia disposed at an end of certain of said columns identifying the same; and a plurality of gummed strips ruled to correspond to the ruling of said columns, each strip being of the approximate width of a column and attachable to said foundation form in a column thereof and having an indicia thereon corresponding to that at the end of one of said columns, said strips being somewhat shorter than said columns whereby upon application of said strips to said foundation form, the indicia on said columns may be exposed to indicate proper or improper location of strips on said foundation form.

4. The combination of a foundation form having a plurality of ruled columns determined by spaced vertical lines and suitable indicia disposed at an end of certain of said columns identifying the same, and a plurality of strips ruled to correspond to the rulings of said columns, each of said strips being of less width and length than the corresponding dimensions of a column and attachable to said foundation form in a column thereof and having an indicia thereon corresponding to that at the end of one of said columns, whereby upon application of said strips to said foundation form, the indicia on said columns may be exposed to indicate proper or improper location of strips on said foundation form.

5. The combination of a foundation form having a plurality of columns determined by spaced vertical lines and suitable indicia disposed at an end of certain of said columns identifying the same; and a plurality of ruled strips detachably united with one another, each of the approximate width of a column and individually attachable to said foundation form in a column thereof and having an indicia thereon corresponding to that at the end of one of said columns, said strips being somewhat shorter than said columns whereby upon application of said strips to said foundation form, the indicia on said columns may be exposed to indicate proper or improper location of strips on said foundation form.

6. The combination of a foundation form having a plurality of columns and suitable indicia disposed at an end of certain of said columns identifying the same, and a sheet of shorter height than said foundation form, said sheet being vertically scored to form a plurality of detachable strips, each of said detachable strips having an indicia thereon corresponding to that at the end of one of said columns, whereby upon application of said strips to said blank form, the indicia on said columns may be exposed to indicate proper or improper location of strips on said foundation form.

7. The combination of a foundation form having a plurality of columns determined by spaced vertical lines, and suitable indicia disposed at an end of certain of said columns identifying the same; and a gummed sheet of shorter height than said foundation form having vertical lines spaced apart a distance somewhat less than the column determining lines of said foundation form, said gummed sheet being vertically scored intermediate said vertical lines to form a plurality of detachable strips having a dollars-cents dividing line transverse to the rulings thereon, each of said detachable strips having an indicia thereon corresponding to that at the end of one of said columns, whereby upon application of said strips to said foundation form, the indicia on said columns may be exposed to indicate proper or improper location of strips on said foundation form.

8. The combination of a foundation form having a plurality of ruled columns determined by vertically spaced lines and a gummed sheet ruled to correspond to the rulings of said columns and having vertical lines spaced apart a distance somewhat less than the column determining lines of said blank form, said gummed sheet being vertically scored intermediate said vertical lines to form a plurality of ruled detachable strips having a dollars-cents dividing line transverse to the rulings thereon, and means for indicating proper or improper location of strips on said foundation form when applied thereto.

9. The combination of a foundation form having a plurality of columns determined by spaced vertical lines, and a sheet vertically scored to form a plurality of detachable strips applicable to said foundation form between the column determining lines thereof, means for securing such strips to a desired column of said foundation form, and means for indicating proper or improper location of such strips when applied to said foundation form.

10. A system of preparing business records, comprising a plurality of foundation forms each having a plurality of columns and separate identifying indicia disposed at the ends of said columns, and a plurality of sheets, of less length than said columns and each provided with vertical scores to form a plurality of detachable strips, each of said vertical strips having indicia thereon corresponding with indicia at the end of that column of each said form with which it is to be associated, whereby upon application of each said strip to said form, the indicia on said form may be exposed to indicate proper or improper location of strips on said form.

ALDEN HANSEN.